2;
United States Patent

[11] 3,617,246

[72] Inventors Werner Duyfjes
 Amsterdam;
 Willem De Lange, Amsterdam; Johan
 Thomas Minnigh, Rotterdam, all of
 Netherlands
[21] Appl. No. 649,148
[22] Filed June 27, 1967
[45] Patented Nov. 2, 1971
[73] Assignee U. S. Philips Corporation
 New York, N.Y.
[32] Priorities June 28, 1966
[33]  Netherlands
[31]  6608931;
 June 6, 1967, Netherlands, No. 6707830

[54] PESTICIDE GRANULES AND METHOD OF
 PREPARING SUCH GRANULES
 3 Claims, No Drawings
[52] U.S. Cl. .................................................. 71/79,
 71/88, 424/167, 71/DIG. 1

[51] Int. Cl. ....................................................... A01n 9/00
[50] Field of Search .......................................... 71/DIG. 1,
 65, 105, 79

[56] References Cited
UNITED STATES PATENTS

| | | | |
|---|---|---|---|
| 2,992,090 | 7/1961 | Littler ........................ | 71/DIG. 1 |
| 3,056,723 | 10/1962 | Galloway ..................... | 71/DIG. 1 |
| 3,168,437 | 2/1965 | Galloway ..................... | 71/DIG. 1 |
| 2,792,295 | 5/1957 | Wright ........................ | 71/DIG. 1 |

FOREIGN PATENTS

| | | | |
|---|---|---|---|
| 589,926 | 12/1959 | Canada ....................... | 71/DIG. 1 |
| 1,519,731 | 2/1968 | France ........................ | 71/DIG. 1 |

Primary Examiner—James O. Thomas, Jr.
Attorney—Frank R. Trifari

ABSTRACT: Pesticidal granules containing a volatile pesticide and a carrier containing a mineral which absorbs water only very slowly.

PESTICIDE GRANULES AND METHOD OF PREPARING SUCH GRANULES

The invention relates to pesticide granules and to a method of preparing such granules.

In this application, the term "pesticides" is employed to signify compositions used for combating harmful organisms in agriculture, horticulture or sylviculture such as insecticides, fungicides, herbicides, bactericides and nematicides.

These pesticides are generally processed to so-called miscible oils or wettable powders and, after dilution with water, sprayed or atomized onto the vegetation. The pesticides may alternatively be processed to so-called dusts which are dusted onto the vegetation. Especially in recent years, a slightly modified form of processing, i.e. the so-called granular form, has come into prominence. The granular composition concerned is spread on the soil or in the water and disintegrates under the influence or without the influence of water. The diameters of these grains may vary, for example, between 0.1 mm. and 0.5 cm.

These grains are generally prepared by mixing an inert, mostly pulverulent mineral carrier material with a binder, the pesticide and water and by then granulating the moist powder thus obtained. The moist powder may be granulated, for example, by pressing it to plates, strips, tapes or tablets and the like and by then crumbling this material and sieving it. In order to expel undesired quantities of water, the granulate must often be dried. This technique is generally referred to as "compacting" technique.

According to a known method, a mixture of magnesium sulfate, clay, bentonite, lignin sulfonate and active pesticide is ground and then introduced into a rotating disc-shaped "pelletiser." During rotation of the pelletizer, water up to a quantity This 25 percent is atomized onto the mixture. Thus, grains of a given size are obtained which solidify due to the water-binding properties of the magnesium sulfate. This method is not always suitable in practice because of the comparatively high cost price of bentonite, and the necessity to remove water therefrom.

According to another method, marble, limestone or calcite having a Mohs hardness between 3 and 4 is crumbled to a grain size of 0.4 to 2 mm., whereupon the grains are first wetted by spraying them with an aqueous solution of surface-active substance and then coated with a composition which beside a pesticide contains an inert carrier material, a binder and a surface-active substance.

According to another method, dry granular sodium borate and a solid granular herbicide sparingly soluble in water are mixed in the presence of water, the water and the herbicide particles being absorbed at the sodium borate particles.

Although satisfactory results are obtained with many of these methods, they are not always suitable in special cases, for example, when due to particular physical properties, the pesticide cannot be processed to stable granules by the said techniques. A special difficulty arises if the pesticide has a comparatively high volatility in the presence of water. When the temperature of the granule increases, part of the incorporated water will evaporate as a result of which also part of the pesticide that can be distilled together with water will volatilize. When the granules are stored, this will give rise to misgrowth of the granules in the packing owing to crystal growth of the pesticide on the surface of the granules so that the composition becomes unusual.

Investigations leading to the invention have shown that in practice the water content of granules containing a pesticide that can be distilled together with water is not permitted to exceed 5 percent by weight and is preferably lower than 2.5 percent.

In the methods of preparing granules which have been used hitherto, the content of water was comparatively high, i.e. approximately 5 to 25 percent by weight of the total granule weight. This often required either the use of special substances for binding this quantity of water, for example gypsum which is capable of retaining the water in the form of crystal water, or the use of a drying process for expelling the undesired quantity of water. These processes both render the preparation of granules comparatively expensive, while moreover pesticide is lost due to its codistillation with water. Furthermore, for practical reasons, it is not possible to obtain by one of these methods a granule the readily evaporable water content of which lies below 5 percent of the granule weight. Since these known techniques provide granules having a comparatively high water content, they are less suitable for processing to granules of pesticides which are volatile in the presence of water.

The invention relates to granules of a special composition which contain a pesticide which is volatile in the presence of water. The invention further relates to an improved method of preparing such granules with the aid of the compacting technique.

The granules according to the invention contain a small quantity of water, a pesticide volatile in the presence of water, a binder and a special carrier material. Due to a particular composition, the grains have a high stability also for long storing periods and the losses of pesticide are comparatively small in these periods, while the disturbing formation of a cake of granules is substantially completely avoided. The granules also have a high resistance to wear.

A pesticide which is volatile in the presence of water is to be understood to mean hereinafter a pesticide the steam distillation constant of which is in excess of 1. The manner in which this constant can be determined has been described extensively in the literature of the analytic chemistry (cf. inter alia Schoorl, Organische Analyse, Amsterdam 1937, Volume II, pages 195 to 197). Theoretically, the steam distillation constant may become infinitely large, but in practice this value rarely exceeds 35. For 2,6-dichlorobenzonitrik; a known weed killer, this value is $20.6 \pm 0.7$, as has been found by the applicant.

As examples of substances which are suitable for use in the method according to the invention, the following pesticides can be mentioned:
2,6-dichlorobenzonitrile; 2,6-dichlorothiobenzamite; pentachlorophenol; 4-chloropyridine; 5-(3,4-dichlorophenyl)-1-methoxy-1-methylurea; 5-(4-chlorophenyl)-1-methoxyl-methyl 3-amino-2,5-dichlorobenzoic acid; hexachlorocyclohexane. D.D.To; 4-trifluoromethyl-2,6-dinitro-N,N-dipropylaniline; S-n-propyl ethyl-2-butyl-thiol carbamate; S-ethyl-1-hexamethylene imine carbothiolate; 0,0'-dimethyl-0''-cyclohexene-1-yl-phosphate and the corresponding 0,0'-diethyl compound; 2-chloro-allyl-diethyl-dithio-carbamate; α'-chloro-N,N-diallyl acetamide; mixtures of 1,2-dichloropropane and 1,3-dichloro-propene and of the corresponding dibromo-compounds; 1-(chloro-2-norbornyl)-3,3-dimethylurea; 4-chloro-pyridine N-oxyde. According to the invention, granules can be prepared which contain 1 to 50 percent of pesticide.

The carrier material is characterized in that it satisfies the two following conditions:

1. A powder of the carrier material having an average particle size of 0.5 to 0.05 mm. is no longer "free flowing" with a water content of 2 to 7 percent and readily agglomerates.

2. A mixture of the carrier material, binder and pesticide which has a water content of 2 to 7 percent and which readily passes into a crumbly phase of agglomerated particles can be compressed to plates, strips, tapes or tablets all the surfaces of which have a substantially constant hardness. Due to these properties, the pulverization of the plates, strips, tapes or tablets when they are crumbled to granules and processed is only slight and the granules have a high resistance to wear.

According to the improved method of preparing these granules, by a suitable choice of carrier material, comparatively small quantities of water are sufficient to cause the mixture of pesticide, carrier material and binder to pass to the crumbled phase which is required to compress the mixture to plates, strips, tapes or tablets of substantially constant hardness. In this specific preparation method according to the invention, a drying process becomes superfluous so that losses of pesticide, which would occur owing to the volatility of pesticide in the present of water, can be avoided.

The carrier material according to the invention is characterized in that a mixture of a powder of this material and a binder is no longer "free flowing" already with a water content of 2 to 7 percent and readily forms a crumbly powder of agglomerated particles.

Carrier materials satisfying the said conditions are especially minerals of the carbonate type such as calcium carbonate, magnesium carbonate or calcium magnesium carbonate. Examples are dolomite, chalk, limestone, marl or marble or mixtures thereof. Satisfactory results were obtained more particularly with dolomite.

However, as an alternative strong water-binding carrier materials may be used, for example silicates, amongst other kaolinite attapulgite, bentonite, anhydrous calcium sulfate which have been treated with a water-repellent agent such as a fatty alcohol, a silicon oil, a hydrocarbon oil or a higher fatty acid such as stearic acid, as a result of which separate particles are surrounded by a layer of water-repellent agent, due to which water is less rapidly absorbed.

In other words, use is generally made of powdered minerals which take up water, either slowly or to a low percentage, and which have these properties either by nature or by a special step. The carrier materials to be used in accordance with the invention which satisfy the above conditions are referred to hereinafter as water-repellent mineral powders.

Thus, the invention relates to pesticide granules which contain beside a pesticide a carrier material, a binder and water and which are characterized in that the pesticide is volatile in the presence of water, in that the carrier material is a powdered mineral which take up mineral either slowly or to a low percentage and in that the water content does not exceed 5 percent by weight. The invention further relates to the following method of preparing said granules: a crumbly mixture of pesticide, a powdered mineral as hereinbefore indicated, a binder and 2 to 7 percent of water is compressed to plates, strips, tapes or tablets which are then crumbled to granules of the desired dimensions. The binder serves to ensure not only that the constituents to be mixed firmly adhere to each other under the influence of water and under pressure, but also that the granules, when they have been spread on the soil or in the water, disintegrate under the influence of water so that the pesticide can become effective. Therefore, it is not necessary for the binder to be completely soluble in water. Strongly varying kinds of suitable hydrophilic binders can be mentioned, such as albumins or carbohydrates, and further binders on the basis of synthetic resin, such as sodium-, or calcium caseinate, gelatin, skim or whole milk powder, alginates, pectinates, starch hydrolisates, polysaccharides, acrylates, lignin sulfonates, sodium silicate and polyvinyl pyrrolidon or polyethylene polysulfide. In practice, calcium lignin sulfonate has proved particularly suitable for use in the method according to the invention. The commercial product is generally a more or less purified product which has been obtained by the decomposition of wood by means of calcium bisulfite. Calcium lignin sulfonate is also known under the name of sulfite lye.

In order to obtain satisfactory granules, it is desirable that the quantity of binder should be 1 to 10 percent of the total granule weight.

A crumbly mixture of pesticide, carrier material, binder and water can be obtained by a conventional method. In a very suitable method, finely ground carrier material, pesticide and binder are mixed without previous addition of water and this mixture is sprayed in a rotating drum with 2 to 7 percent by weight of water. This water may contain a binder. During this treatment, the mixture loses its powdered structure and the separate particles are united in a more or less loose cohesion to comparatively coarse soft grains so that the original "free flowing" mixture passes to a crumbled phase.

In a slightly modified method, the starting mixture consists of pesticide, carrier material, binder and, as the case may be, other auxiliary substances which already contain to a lesser or greater extent the desired quantity of water, so that no water at all or only a smaller quantity of water need be added. In general, the manner in which the total content of water of 2 to 7 percent of the mixture to be compressed is attained, is not essential. In this respect, it is solely of importance that the mixture to be pressed should be in a crumbled state. It is further recommendable that the particle size of the constituents to be mixed should be small and should lie, for example, between 0.001 and 1 mm. In general, a suitable average particle size of the pesticide lies between 0.001 and 0.5 mm. A suitable particle size for a pesticide satisfactorily soluble in water lies between 0.2 and 0.5 mm., while for a pesticide sparingly soluble in water a particle size of 0.001 to 0.02 mm. is more satisfactory. The particle size of the mineral powder is preferably smaller than 0.5 mm. Satisfactory results were obtained with a mineral powder having example, average particle size of 0.1 to 0.2 mm. It is generally recommendable that the particle size of the carrier material should exceed a few times, for example, by a factor 10, that of the pesticide.

If desired, surface-active substance or a conditioner is added to the binder or to the remaining constituents. Thus, it is ensured that the binder contacts more uniformly both the particles of the carrier and those of the pesticide.

Suitable surface-active substances are sulfated fatty alcohols, alkylaryl sulfonates, alkylphenol polyglycol ethers, fatty acid N-alkyl taurates. It is also advantageous to use in this composition cation-active surface-active substances such as cetyltrimethylammonium chloride or other quaternary ammonium compounds. Conditioners producing the desired effect are especially silicon compounds, more particularly colloidal silicon dioxide, precipitated or nonprecipitated silicates, for example, calcium silicates.

According to the invention, satisfactory granules can also be prepared without the use of these surface-active substances or conditioners, but if these substances are used, the quantity of surface-active substance and/or conditioner suitably lies between 0 and 5 percent.

Furthermore, it may be recommendable to add specific binders to improve the hardness of the granules. Sodium metasilicate has proved particularly suitable to obtain a hard granule.

The use of these substances is not essential either to obtain the granules in accordance with the invention. If these substances are used, however, a quantity of 0 to 5 percent by weight is sufficient.

When the crumbly mixture is pressed, for example, by passing it between two rotating rollers, plates, strips, tapes or tablets can be obtained which, after being crumbled and granulated, are processed to granules. In general, the pressure applied is at least 300 kg./sq.cm. preferably above 500 kg./sq.cm. Due to the exerted pressure, the temperature increases so that part of the water in the mixture evaporates, as a result of which the content of water in the final product can be readily reduced to a value below 4 percent. By a suitable choice of the quantities of carrier material, binder, active substance and water, the whole process can be carried out so that the final product does not contain more than 1 to 2.5 percent of water.

The mass pressed to plates, strips, tapes or tablets can be processed to granules by any suitable method. In one of the simplest methods, the compressed mass is crumbled in a crumbler to small particles. With the aid of these crumblers, a comparatively high percentage of particles having a size of 0.25 to 1.25 mm. can be obtained, which particles can then be separated by sieving. The part of the granulate the particles of which are considered to be too small or too large, can be readily fed back into the processing.

The granular composition according to the invention preferably contains 1 to 50 percent by weight of a pesticide having a steam distillation constant in excess of 1, 1 to 10 percent by weight of a binder of the kind described above, 1 to 4 percent by weight of water, 0 to 5 percent by weight of surface-active substance and 0 to 5 percent by weight of a solidifying agent and/or of a conditioner, and for the remaining part a mineral powder mainly consisting of calcium, magnesium- or magnesium calcium carbonate and its grains have an average cross section of 0.25 to 1 mm.

The invention is of particular advantage for granulating 2,6-dichlorobenzonitrile. A granule thus prepared in accordance with the invention preferably has the following composition: 2 to 10 percent by weight of 2,6-dichlorobenzonitrile, 4 to 10 percent by weight of calcium lignin sulfonate (dry weight), 0 to 2 percent by weight of a wetting agent, 1 to 2.5 percent by weight of water and for the remaining part dolomite or marl, the average particle size of the granulate lying between 0.25 and 1.25 mm.

EXAMPLE

Eighty-four Kg. of ground dolomite (or marl), 5 kg. of powdered sulfite lye, 1 kg. of sodium salt of sulfated fatty alcohols, and 10 kg. of ground 2,6-dichlorobenzonitrile (99 percent of the particles have a size smaller than 44 $\mu$) were mixed in a horizontally arranged mixer. After complete homogenization of the mixture, 2 liters of water are atomized onto the powder while stirring, whereupon an after-mixing treatment is carried out for a few minutes.

The powder, which has been wetted with water and has become crumbly, is now introduced into a so-called "compactor" which compresses the powder under high pressure (6,000 kg./sq.cm.) to "tapes," "strips," "plates" or "tablets."

Heat is developed during this process so that part of the water evaporates.

The "strips", "tapes", "plates" or "tablets" are very hard after cooling and are then passed through a crumbler which crumbles a major part of the strips to granules.

These granules are separated by a continuously operating sieving machine in the desired sizes.

The unduly fine (pulverulent) part is fed back into the mixing apparatus and the unduly coarse part is crumbled again by the crumbler, the granules being again separated in the desired sizes by the sieving machine. The granulate thus obtained contained 2 percent by weight of water and had an average particle size of 0.75 mm.

What is claimed is:

1. A method of preparing pesticidal granules comprising a pesticide having a steam distillation constant in excess of 1 in a pesticidally effective amount, a binder, a carrier material consisting essentially of powdered carbonates and water up to 5 percent by weight of the composition said method comprising preparing a crumbly mixture of the solid ingredients involved including 2 to 7 percent of water, pressing said mixture into flat pieces and then crumbling said flat pieces into small particles.

2. The method of claim 1 wherein the water is introduced into the crumbly mixture while mixing of the ingredients is carried on.

3. Pesticidal granules prepared according to the method of claim 1.

* * * * *

PO-1050
(5/69)

UNITED STATES PATENT OFFICE
CERTIFICATE OF CORRECTION

Patent No. 3,617,246 (PHN 1737) Dated November 2, 1971

Inventor(s) WERNER DUYFJES ET AL

It is certified that error appears in the above-identified patent and that said Letters Patent are hereby corrected as shown below:

Column 2, line 33, "dichlorobenzonitrik" should be
-- dichlorobenzonitrile --.

line 43, "D.D.to" should be -- D.D.T. --.

Signed and sealed this 11th day of July 1972.

(SEAL)
Attest:

EDWARD M. FLETCHER, JR.
Attesting Officer

ROBERT GOTTSCHALK
Commissioner of Patents